United States Patent [19]

Harry

[11] Patent Number: 4,550,814
[45] Date of Patent: Nov. 5, 1985

[54] ELECTROMAGNETIC CLUTCH-BRAKE FOR INDUSTRIAL SEWING MACHINE

[75] Inventor: Alan J. Harry, Royston, England

[73] Assignee: Frankl & Kirchner GmbH & Co. KG Fabrik für Elektromotoren u. elektrische Apparate, Schwetzingen/Baden, Fed. Rep. of Germany

[21] Appl. No.: 433,607

[22] Filed: Oct. 12, 1982

[30] Foreign Application Priority Data

Oct. 27, 1981 [DE] Fed. Rep. of Germany ....... 3142570

[51] Int. Cl.[4] ............................................ B60K 41/24
[52] U.S. Cl. ................................... 192/18 B; 310/90
[58] Field of Search ................ 192/18 B, 18 A, 18 R, 192/84 AA, 84 AB, 110 R; 310/76, 77, 92, 93, 94, 90; 188/161

[56] References Cited

U.S. PATENT DOCUMENTS

| | | | |
|---|---|---|---|
| 2,777,550 | 1/1957 | Forster | 192/84 AA |
| 3,240,302 | 3/1966 | Van Tuyl | 192/18 B |
| 3,581,855 | 6/1971 | Taeffner | 192/18 B |
| 4,201,280 | 5/1980 | Gattiker | 192/18 A |

FOREIGN PATENT DOCUMENTS

| | | |
|---|---|---|
| 749148 | 12/1966 | Canada . |
| 2231501 | 1/1974 | Fed. Rep. of Germany . |
| 3130819 | 8/1981 | Fed. Rep. of Germany . |

*Primary Examiner*—George H. Krizmanich
*Attorney, Agent, or Firm*—Felfe & Lynch

[57] ABSTRACT

In a clutch-and-brake unit for use with a continuously rotating, motor-driven shaft, for example in an industrial sewing machine, a single disk has a clutch surface on one side and a brake surface on the other side. The disk is magnetically urged into operative engagement with clutch and brake pressure plates facing the respective clutch and brake surfaces of the disk, the clutch pressure plate being rotated by the motor-driven shaft to rotate the disk and a shaft connected thereto when operatively engaged, and the brake pressure plate being non-rotatable to brake the shaft. The brake pressure plate is also constantly urged into light contact with the brake surface sufficient to brake the disk and shaft only when the disk is not operatively engaged with the clutch pressure plate. This prevents the disk and connected shaft from rotating when neither the clutch nor the brake are operatively engaged and eliminates engagement noise when the brake pressure plate is operatively engaged.

6 Claims, 2 Drawing Figures

ELECTROMAGNETIC CLUTCH-BRAKE FOR INDUSTRIAL SEWING MACHINE

BACKGROUND OF THE INVENTION

The invention relates to a clutch-and-brake unit.

The generally-known clutch-and-brake unit of the type in question comprises a brake disk and a clutch disk which can be brought into frictional engagement with brake and clutch pressure plates independently of each other. The clutch and brake disks are either of rigid construction and slidable along splines on the driven shaft, or axially fixed to the driven shaft and constructed to be axially resilient. To provide two such disks is costly with respect to both design and production and also requires much space. Since such drives are engaged and disengaged with extremely high frequency (there may be as many as 30,000 clutch and brake operating cycles in the course of an eight-hour work shift), it is also important that the operating noise be minimized.

From German patent application No. DOS 22 31 501, an electromagnetically actuable clutch-and-brake unit is known in which a clutch disk on a driven shaft is secured against rotation relative thereto but axially displaceable. It is provided with a clutch facing on one side and is adapted to be brought into engagement with a rotating clutch pressure plate, for example, the flywheel of a motor, when a clutch magnet is energized. On its other side, the clutch disk is provided with a brake lining which by means of initially tensioned springs is brought into engagement with a brake pressure plate that is fixed to the housing. Now such a design is not suited for a control drive of the type in question since it does not permit controlled braking. Moreover, considerable operating noise is generated.

From Canadian Pat. No. 749,148, a clutch-and-brake unit of the type in question is known in which the clutch coil and the brake coil are disposed in an outer bearing bracket which serves both as clutch bearing bracket and as brake bearing bracket.

SUMMARY OF THE INVENTION

The invention thus has as its object to construct a clutch-and-brake unit of the type in question in such a way that the design and production expenditure is reduced and no annoying operating noise is generated.

In accordance with the invention, this object is accomplished.

One essential characteristic of the invention is that there is only one disk serving as both clutch disk and brake disk; this assures that the brake is released when the clutch is engaged. Another characteristic floating suspension of the brake pressure plate, avoids a noise-generating air gap between the brake friction lining of the clutch/brake disk and the brake pressure plate; also, when the clutch is disengaged, it always maintains light contact between the brake pressure plate and the brake friction lining so that entrainment of the drive shaft in idling is prevented.

A simple overall design of the brake pressure plate is achieved, the guide flange being moreover disposed so that the brake magnetic path can pass through it.

There can also be alternative measures for preventing the clutch/brake disk from being forced against the clutch pressure plate when the clutch coil is not energized.

BRIEF DESCRIPTION OF THE DRAWINGS

Further advantages and characteristics of the invention will be apparent from the following description of two embodiments with reference to the drawing, wherein.

Figure 1:
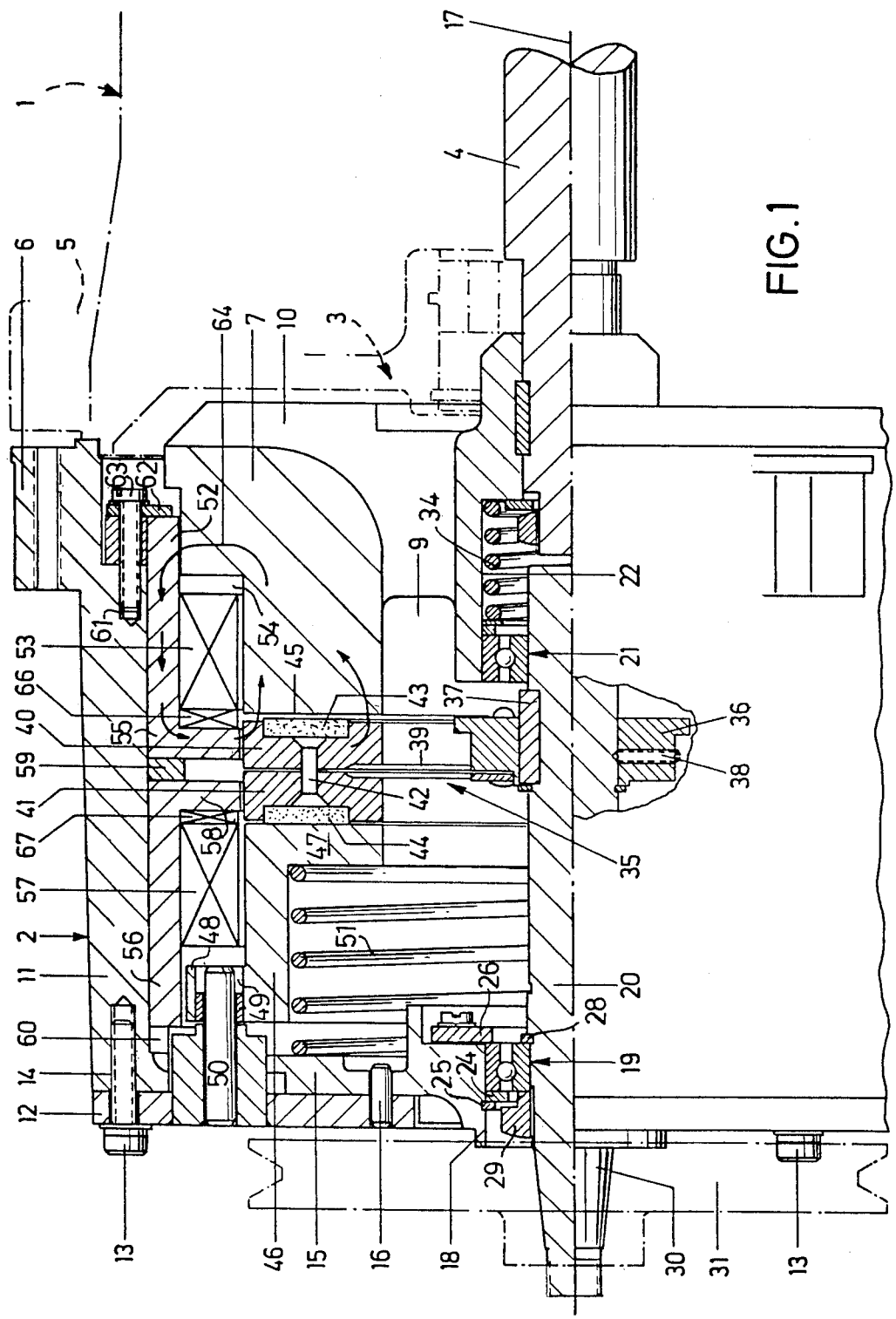
FIG. 1 is a semisection through a brake/clutch unit in accordance with the invention comprising an axially fixed clutch/brake disk of resilient construction.

Since the two embodiments illustrated in the drawing differ only with respect to the construction of the clutch/brake disk, they need to be described but once. And since the clutch/brake units are essentially designed to have rotational symmetry, it will suffice to show and describe only a semisectional view.

DETAILED DESCRIPTION OF THE INVENTION

The drive illustrated in the drawing comprises a motor 1, merely outlined, and a brake/clutch unit 2. The motor 1 is a conventional electric drive motor as illustrated and described in German patent application No. DOS 31 30 819, for example. From the bearing plate 3 on the output side of the motor 1 there extends its motor shaft 4. Near its bearing plate 3, the motor 1 comprises a circular flange 5 which is adapted to be bolted to an associated flange 6 of the brake/clutch unit 2.

Outside the bearing plate 3 of the motor 1, a flywheel 7 is splined to the motor shaft 4. The flywheel 7 also serves as a fan wheel and to that end is provided with fan blades 10 on its side facing the bearing plate 3 and in flow channels 9 extending approximately axially.

The brake/clutch unit 2 comprises an approximately cylindrical housing 11 on whose peripheral region facing the motor 1 a flange 6 is formed, and is provided on its side remote from the flange 6 with a cover 12 which is held by screws 13 inserted in appropriately threaded bores 14 in the housing 11.

The cover 12 abuts by its inside on an output bearing plate 15 which is integral with the housing 11. It is aligned relative to said bearing plate, and hence relative to the common longitudinal center axis 17 of motor and brake/clutch unit 2, by means of centering pins 16. In the bearing plate 15 there is a bearing bore 18 in which a driven shaft 20 that is disposed concentrically with the shaft 4 is supported by means of an antifriction bearing 19 constructed as a grooved ball bearing. At its other end facing the motor 1, the driven shaft 20 is likewise supported in a bearing bore 22 in the flywheel 7 by means of an antifriction bearing 21 constructed as a grooved ball bearing.

Toward the outside, the outer ring of the antifriction bearing 19 abuts through a thrust ring 24 on a retaining ring 25 secured in the bearing bore 18. With respect to the inside of the brake-clutch unit 2 it is secured by means of a retaining ring 26 threaded onto the output bearing plate 15. The inner ring of the antifriction bearing 19 is secured to the driven shaft 20 with respect to the interior of the brake/clutch unit 2 by means of a retaining ring 28. A nut 29 on the driven shaft 20 clamps the inner ring of the antifriction bearing 19 against the retaining ring 28. At its outer end, the driven shaft comprises a cone 30 on which a driven belt pulley 31 is mounted in the usual manner.

The inner ring of the antifriction bearing 21 is a force fit on the driven shaft 20. Its outer ring is a sliding fit in the bearing bore 22 in the flywheel 7 and bears on an initially-tensioned helical compression spring 34 whose other of which end is supported on the bottom of the bearing bore 22 which forms a blind hole, so that the driven shaft 20 is always forced against its mounting point in the output bearing plate 15 and the latter, in turn, against the cover 12.

A clutch/brake disk at 35 is mounted on the driven shaft 20. In FIG. 1, it comprises a hub 36 which, through splines 37, is secured against rotation relative to the shaft and, through a radially inserted set screw 38, is axially fixed. Secured to the hub is a resiliently constructed, radially projecting spider 39 to which a clutch armature ring 40 and a brake armature ring 41 are attached by means of a rivet 42 common to both. To the opposed faces of the armature rings 40 and 41 there are fastened in appropriate annular depressions an annular clutch friction facing 43 and a likewise annular brake friction lining 44, respectively, by being cemented thereto, for example. The hub 36 and the spider 39, the armature rings 40 and 41, the friction facing 43 and the friction lining 44 form a unit.

A pressure plate 45 for the clutch is formed by the face of the flywheel 7 which is directed toward the friction facing 43 of the clutch, in other words, when static frictional contact is established between the clutch friction facing 43 and the flywheel 7 of the motor 1, the driven shaft 20 is driven, and with it the driven belt pulley 31.

Associated with the brake friction lining 44 is a brake pressure plate 46 which is of substantially cylindrical construction. At the end facing the brake friction lining, it comprises a brake flange 47 which projects radially inwardly with an external surface which bears on the brake friction lining 44. At its other end which faces the cover 12, the brake pressure plate 46 comprises a guide flange 48 which is provided with coaxial guide bores 49 into which guide pins 50 project which are coaxially attached to the cover 12, the brake pressure plate 46 being secured by said pins secured against rotation but freely displaceable in the direction of the axis 17. Disposed in the interior of the brake pressure plate 46 is an initially tensioned soft helical compression spring 51 which at one end bears on the output bearing plate 15 and at the other end on the brake flange 47 and urges the brake pressure plate 46 lightly but steadily against the brake friction lining of the clutch/brake disk 41. The pressure of the compression spring 51 is designed to be lower than the opposing force of the resilient spider 39 so that when the disk 35 is at rest it is not forced with its clutch friction facing 43 against the flywheel 7 by the force of the compression spring 51.

Disposed radially about the flywheel 7 and the clutch armature ring 40 is a clutch coil casing 52 with a clutch coil 53 which penetrates into an annular recess 54 in the flywheel. The clutch coil casing 52 comprises an annular flange 55 which surrounds the clutch armature ring 40 with an air gap of not more than a few tenths of a millimeter between them. Similarly, there is provided between the clutch coil casing 52 and the flywheel an air gap of not more than a few tenths of a millimeter.

Disposed in mirror symmetry with the clutch coil casing 52 is a brake coil casing 56 of like construction and with a brake coil 57 which surrounds the brake pressure plate 46. An annular flange 58 of the brake coil casing surrounds the brake armature ring 41 with an air gap of a width of not more than a few tenths of a millimeter between them. The two coil casings 52 and 56 abut by their cylindrical shell on the housing 11, a spacer disk 59 made of a magnetically insulating material being disposed between their two annular flanges 55 and 58. They are clamped against an abutment member 60 disposed in proximity to the cover 12, threaded bores 61 being radially provided to this end within the flange 6 in the housing 11 in which clamping screws 63 are inserted which through a clamping ring 62 bear on the outer face of the clutch coil casing 52. The magnetic path 64 of the clutch coil 53 passes through the clutch coil casing 52, the annular flange 55, the clutch armature ring, the air gap between the clutch armature ring 40 and the clutch pressure plate 45, and the flywheel 7 back to the clutch coil casing 52.

The brake magnetic path similarly passes from the brake coil casing 56 through the annular flange 58, the brake armature ring, the air gap between the brake armature ring 41 and the brake pressure plate 46, the brake pressure plate 46 and the guide flange 48 back to the brake coil casing 56.

Since the energization of the clutch coil 53 may give rise to stray fluxes resulting in magnetic attraction between the brake pressure plate 46 and the brake armature ring 41, and hence in undesired braking, and since conversely the energization of the brake coil 57 may give rise to stray fluxes resulting in magnetic attraction between the clutch armature ring 40 and the clutch pressure plate 45, and hence in undesired engagement of the clutch, there are disposed between the clutch coil 53 and the associated annular flange 55, and between the brake coil 57 and the associated annular flange 58, bucking coils 66 and 67, respectively, whose effect opposes that of the corresponding other coils 53 and 57, respectively. The bucking coil 66 spatially associated with the clutch coil 53 thus is energized simultaneously with the brake coil 57 and therefore generates in the vicinity of the brake pressure plate 46 an opposing magnetic field which cancels the stray flux. Similarly, the bucking coil 67 which is spatially associated with the brake coil 57 is connected so that it is energized together with the clutch coil 53 and builds up an opposing field cancelling the stray flux of the latter.

When the clutch coil 53 is energized, the clutch/brake disk 35 is drawn with elastic deformation of the spider 39 toward the clutch pressure plate 45, with the result that frictional contact is established between the disk 35 and the flywheel 7. The brake pressure plate 46 then moves toward the flywheel 7. When the clutch coil 53 is deenergized and the brake coil 57 is energized, there is therefore no contact travel between the brake friction lining 44 and the brake pressure plate 46, which means that no operating noise is generated. The spider 39 merely lifts the clutch friction facing 43 off the clutch pressure plate 45, with a corresponding elastic restoration, which means, of course, that the brake pressure plate 46 is also moved back a corresponding distance of a few tenths of a millimeter in the direction of the cover 12.

Figure 2:
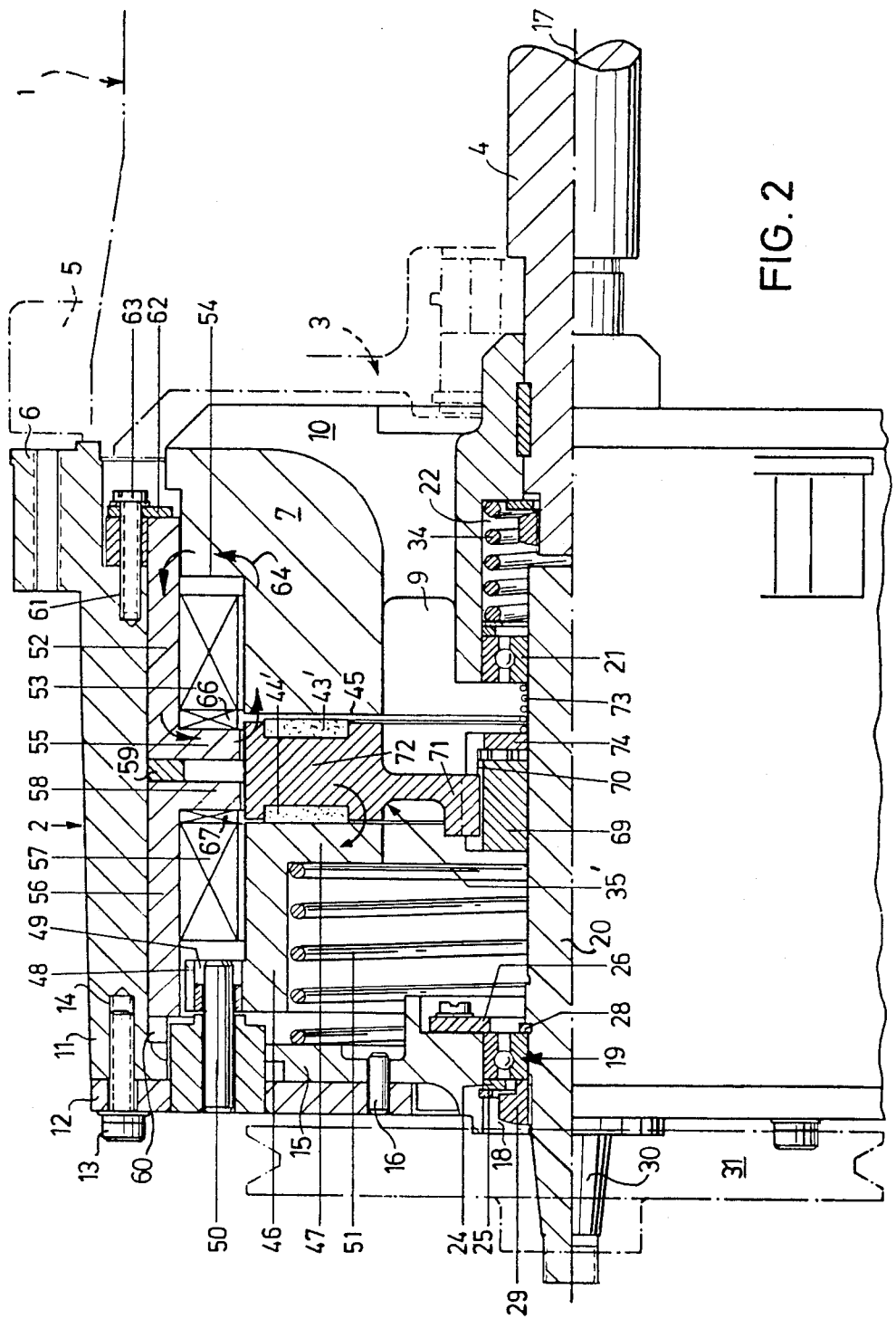
FIG. 2 shows a modified embodiment with a rigid, axially displaceable clutch/brake disk.

The embodiment illustrated in FIG. 2 differs from that of FIG. 1 only in that the clutch/brake disk 35' as such is of rigid construction but is mounted for axial displacement on the driven shaft 20. To this end there is mounted on the driven shaft 20, for example, by being shrunk onto it, a shaft section 69 which is secured against axial and rotational motion relative to said shaft and is provided on its outer periphery with splines 70.

The clutch/brake disk 68 comprises a hub 71 provided with corresponding internal grooves so that the hub 71 is axially displaceable on the shaft section 69 but secured against rotation relative thereto. In its peripheral region, the clutch/brake disk 68 is constructed as an armature ring 72 on whose two faces the clutch friction facing 43' and the brake lining 44' are accommodated in appropriate depressions.

Between the hub 71 and the inner ring 32 of the antifriction bearing 21 disposed in the flywheel 7, there is located an initially tensioned helical compression spring 73 for which the inner ring 32 forms an abutment that is axially fixed relative to the driven shaft 20. Since the compression spring 73 directly surrounds the driven shaft, a support sleeve 74 is provided which at one end bears on the hub 71 and with the other end extends as far as the driven shaft. Said compression spring 73 is designed so that with respect to its force it is in equilibrium with the helical compression spring 51 in the brake pressure plate 46, with the result that the clutch/brake disk 68 in its rest position is not urged against the clutch pressure plate 45 by the compression spring 51. In this embodiment, the compression spring 73 thus assumes the function of the resilient spider 39 in the embodiment of FIG. 1.

The heat generated in braking and clutching is satisfactorily removed through the flow channels 9 and the fan blades 10 in the flywheel 7.

It will be understood that the specification and examples are illustrative but not limitative of the present invention and that other embodiments within the spirit and scope of the invention will suggest themselves to those skilled in the art.

What is claimed is:

1. A clutch-and-brake unit for use with a continuously-rotating, motor-driven shaft, comprising:
   (a) a rotatable shaft;
   (b) a disk connected to the rotatable shaft for rotation therewith and having a clutch surface on one side and a brake surface on the other side, the disk being secured against axial movement relative to the rotatable shaft and comprising a spider which is resiliently bendable axially of the shaft;
   (c) a clutch pressure plate rotated by the motor-driven shaft and facing the clutch surface of the disk;
   (d) a brake pressure plate facing the brake surface of the disk, secured against rotation, and movable axially of the rotatable shaft into engagement with the brake surface;
   (e) means for constantly urging the brake pressure plate into engagement with the brake surface of the disk with a force which is sufficient to brake the disk against rotation only when the clutch surface of the disk is not operatively engaged with the clutch pressure plate, the resilient force of the spider and the force of the means for constantly urging the brake pressure plate into engagement with the brake surface being in equilibrium; and
   (f) clutch and brake surfaces of the disk respectively into clutching and braking operative engagement with the clutch and brake pressure plates.

2. A clutch-and-brake unit as in claim 1, wherein the means for constantly urging the brake pressure plate comprises a spring.

3. A clutch-and-brake unit as in claim 2, wherein the brake pressure plate has a hollow, cylindrical body and the spring is disposed therein.

4. A clutch-and-brake unit as in claim 3, wherein the body has guide bores, and further comprising guide pins secured against rotation about the axis of the rotatable shaft and projecting into the guide bores for securing the brake pressure plate against rotation and allowing movement thereof into engagement with the brake surface of the disk.

5. A clutch-and-brake unit as in claim 2 or 3, wherein the clutch and brake magentic coil means comprise a pair of operating coils for respectively moving the clutch and brake surfaces and further comprising a bucking coil associated with each operating coil and operatively connected with the other operating coil for opposing the magnetic flux therefrom.

6. A clutch-and-brake unit as in claim 1, wherein the clutch and brake magnetic coil means comprise a pair of operating coils for respectively moving and clutch and brake surfaces and further comprising a bucking coil associated with each operating coil and operatively connected with the other operating coil for opposing the magnetic flux therefrom.

* * * * *